United States Patent [19]

Iseler et al.

[11] Patent Number: 4,529,757
[45] Date of Patent: Jul. 16, 1985

[54] THERMOSETTING RESIN PATCHING COMPOUND

[75] Inventors: Kenneth A. Iseler, Richmond; Joseph D. Connolly, Warren; Mayur S. Shah, Sterling Heights, all of Mich.

[73] Assignee: The Budd Company, Troy, Mich.

[21] Appl. No.: 530,858

[22] Filed: Sep. 9, 1983

Related U.S. Application Data

[63] Continuation of Ser. No. 347,848, Feb. 11, 1982, abandoned, which is a continuation-in-part of Ser. No. 150,467, May 16, 1980, abandoned.

[51] Int. Cl.³ .................... C08L 31/08; C08L 67/02
[52] U.S. Cl. .................... 523/513; 523/500; 523/514; 523/521; 523/523; 524/919
[58] Field of Search ............ 523/500, 513, 514, 521, 523/523; 524/919

[56] References Cited

U.S. PATENT DOCUMENTS

| | | | |
|---|---|---|---|
| 2,631,137 | 3/1953 | Loritsch et al. | 523/523 |
| 2,770,556 | 11/1956 | Grangaard et al. | 427/140 |
| 3,701,748 | 10/1972 | Kroekel | 523/523 |
| 3,721,642 | 3/1973 | Schalin et al. | 523/523 |
| 3,772,241 | 11/1973 | Kroekel | 523/523 |
| 3,844,822 | 10/1974 | Boss et al. | 427/377 |
| 3,873,475 | 3/1975 | Pechacek et al. | 427/142 |
| 3,925,299 | 12/1975 | Phillips | 523/523 |
| 3,998,909 | 12/1976 | Roberts et al. | 523/500 |
| 4,053,448 | 10/1977 | Holle | 524/919 |
| 4,101,604 | 7/1978 | Rowe | 523/513 |
| 4,160,758 | 7/1979 | Gardner | 523/523 |
| 4,172,059 | 10/1979 | Atkins et al. | 523/514 |
| 4,181,547 | 1/1980 | Speer | 427/140 |
| 4,322,334 | 3/1982 | Arakawa et al. | 523/523 |

FOREIGN PATENT DOCUMENTS 55-12151  6/1980  Japan .................... 523/500

Primary Examiner—Ronald W. Griffin
Attorney, Agent, or Firm—Fisher, Crampton, Groh & McGuire

[57]         ABSTRACT

A method for repairing plastics, metal and the like. The method uses a compound comprising a thermosetting unsaturated polyester resin, a thermoplastic resin mixed with said polyester, particulate inorganic filler, as well as additional metallic particulate material, fibrous materials and a catalyst. The compound when cured at a relatively elevated temperature of about 325°–350° F. provides a low shrink material which can be painted and baked on normal processing lines up to 350° F. without separating from the underlying substrate.

6 Claims, No Drawings

THERMOSETTING RESIN PATCHING COMPOUND

This application is a continuation of continuation-in-part application, U.S. Ser. No. 347,848 filed Feb. 11, 1982, now abandoned, which was based on continuation-in-part application, U.S. Ser. No. 150,467 filed May 16, 1980, now abandoned.

This invention relates to a method of using filled resin composition in repairing or patching plastics and metal parts.

Prior art patching compounds are generally designed to have good adhesion to the materials to which they are applied at normal room temperatures and to some extent at temperatures below room temperature down to and including −30° F. However, such patching compounds have not been formulated which are capable of withstanding tempratures on the order of 325°–350° F. without substantial shrinkage. When used to repair defects in a plastic or metal part, prior art compounds could not be subjected to the normal painting and baking cycle used by original equipment manufacturers.

A further problem with prior art compositions is the physical characteristic of sandability. For best results, it is desirable that the cured patching composition have sanding characteristics similar to that of the base material being repaired so that upon finishing and sanding, the patched surface, to which an overlying paint or lacquer is to be applied, has a similar texture to the base material.

Briefly, the patching compound of this invention has a first thermosetting, unsaturated polyester resin having a ratio of hydroxyl to carboxyl groups of about 5.7 to 0.8; an acid number of at least 14; and an average molecular weight of approximately 800–5,000. A second, thermoplastic resin syrup is mixed with the first unsaturated polyester resin; the thermoplastic resin being dissolved in an unsaturated monomer. To the resinous materials, various fillers are added to achieve the desired physical properties. Exemplary fillers might include about 10–40 percent by weight of inert, inorganic particles, about 5–15 percent by weight of metallic particulate filler and about 5–25 percent by weight of milled fiber can be added to the polyester resins. A minor amount of a free radical catalyst is added to promote curing. When cured these resins form a solid patch which is sandable, and has good adhesion to metal and plastic substrates. Further, the patch is capable of withstanding normal painting cycles when cured in accordance of the method of this invention without separating from the substrate.

The unsaturated polyester resins employed in the practice of the present invention generally have a ratio of hydroxyl to carboxyl groups between about 5.7 and 0.8, an acid number of at least about 14 and an average molecular weight between about 800–5,000. Resins having these characteristics provide a good thermosetting unsaturated polyester resin which can be cured to form a solid thermoset matrix having good structural integrity when combined with the fillers described hereinafter. The resin preferably has an acid number of at least 14 and a hydroxyl number of at least 14, preferably 14–120, with the preferred acid number range being between about 14–70. Such resins will normally have a molecular weight of about 900–3,500. Resins in this preferred range provide a good combination of relatively rapid gel and cure to a matured product, combied with good physical characteristics. The unsaturated polyester resin is normally present in an amount of about 10–30 weight percent dissolved in an aliphatically unsaturated monomer, such as styrene. The monomer chosen will be compatible with the thermosetting resin and also with the other resinous materials present.

Many useful unsaturated polyester resins can be formed for use as starting materials in the practice of this invention. However, three types useful in the practice of this invention will be disclosed in greater dtail for the purposes of illustration.

A first type of resin is glycol-maleate type resin. This type of unsaturated polyester resin is generally formed from butylene, propylene or ethylene glycol-maleate polyester product and may contain small quantities of other glycols, for example diethylene or dipropylene glycol, neopentyl glycol or the like. Such glycol-maleate products are prepared by cooking together one mole of maleic acid or anhydride, one mole of propylene glycol, 0.1 mole of ethylene glycol, an esterification catalyst and tertiary butyl catechol or hydroquinone inhibitor. Such glycol-maleate polyesters have the properties of high rigidity, high heat resistance and are highly reactive and readily made into low shrink compositions when incorporated into the resin mixture of this invention.

A second type of unsaturated polyester resin useful in the practice of this invention is a glycol-maleate-phthalate type resin prepared from propylene or ethylene glycol, maleic acid or anhydride, and phthalic or isophthalic acid. Also, miscellaneous glycols could be used such as those discussed with respect to the glycol-maleate type. In general, the ratio of maleate to phthalate is about 3:1. Such products are representatively prepared by cooking together 0.75 mole of maleic acid or anhydride, 0.25 mole of isophthalic acid and 1.1 mole of propylene glycol. Such unsaturated polyester resins have the properties of being slightly more resilient, stronger, and slightly lower in heat resistance than the glycol-maleates. These resins are also slightly less reactive than glycol-maleates. It can be used where a slightly longer cure time is desired.

A third example of a resin useful in the practice of this invention is an unsaturated polyester resin of the glycol-maleate-phthalate type having a higher ratio of phthalate to maleate. These unsaturated polyester resins are also formed from ethylene or propylene glycol, maleic acid or anhydride and isophthalic or phthalic acid plus miscellaneous glycols as discussed with respect to the first and second examples. Resins of this type will have a maleate-phthalate ratio generally in the range of about 2:1. Such resins are characterized by extreme toughness, considerably higher elongation, lower heat distortion and a lower reactivity than either of the previously described resin systems.

Aside from the characteristics of the unsaturated resins set forth hereinbefore, the exact type of reactants used to form the unsaturated polyester resin employed is not critical. Polyester resins are known and conventionally made by the condensation of at least one unsaturated dicarboxylic acid or anhydride and at least one glycol wherein water is removed during the condensation-esterification reaction. Examples of suitably unsaturated dicarboxylic acids include alpha, beta ethylenically unsaturated dicarboxylic acids and their anhydrides such as fumaric acid, maleic acid and maleic anhydride. Examples of other polycarboxylic acids and their anhydrides include the phthalic acids and anhydrides, isophthalic acids and anhydrides, succinic acid, adipic acid, and itaconic acid. Other polycarboxylic acids usable herein include citric acid, pyromellitic acid and trimesic acid. The preferred glycols usable to make the polyester resins used in this invention are the alkylene glycols such as ethylene glycol, propylene glycol, neopentyl glycol, butylene glycol, and bisphenol A, such reactants being well known in the art. Either the dicarboxylic acids or the glycols may be halogenated to reduce the flammability of the molded articles.

The acid numbers and the hydroxyl number described here and before and in the claims refer to the unsaturated polyester resin itself. It must therefore be understood that these figures are somewhat higher than would be the case where the hydroxyl and carboxyl numbers are given for a resin which has been dissolved in an unsaturated monomer such as styrene.

The resin compositions of this invention include, a low-shrink additive consisting essentially of a thermoplastic polymer, ordinarily added to the thermosetting resin dissolved in an unsaturated monomer such as styrene. Such a low shrinkage polymer is generally present in an amount of about 5 to 20 parts by weight of total ingredients. Some low-shrink additives, when added to the polyester resin, can be added in the form of a thermoplastic powder which is soluble in part or all of the liquid monomer employed as a solvent with respect to the unsaturated polyester resin. Such low-shrink thermoplastic based additives are described in U.S. Pat. No. 3,701,748; the disclosure of said patent with respect to suitable thermoplastic resins and their characteristics is incorporated herein by reference. In particular, the patent is of interest with respect to how thermoplastic polymers or copolymers should be employed to obtain low-shrink characteristics in thermosetting systems; except that for the purposes of this invention, it is not necessary that the thermoplastic polymers be compatible with the thermosetting polymers to form an optically heterogenous cured composition.

One example of a suitable thermoplastic material is an acrylic syrup of methylmethacrylate containing about 30-40 percent by weight of solid methylmethacrylate dissolved in styrene monomer. Another example of a suitable thermoplastic material is a polyvinylacetate syrup containing about 30 to 40 percent by weight of solids dissolved in styrene monomer.

To the combination of resins disclosed hereinbefore, various fillers and reinforcing materials will be added to form the compositions of this invention. For example, generally a reinforcing fiber will be added to the composition, fiber reinforcement being present in the amount of about 5-25 percent by weight of the total composition. Examples of suitable reinforcing fibers are glass fibers, cotton fibers, sisal fibers, Kevlar fibers, asbestos fibers, and other fibers such as metal fibers and whiskers, boron fibers and whiskers and graphite fibers and whiskers. In addition, a wide variety of organic or inorganic fibers may be used. Glass fibers are the most desirable for most applications because of their low cost and high strength.

In addition to the reinforcing fibers, the compositions of this invention will have one or more particulate fillers added to the resinous material. Many different types of fillers are contemplated within the scope of this invention, such as inorganic fillers, i.e., silicates, asbestos, calcium carbonates, mica, barytes, clay, diatomaceous earth, microballoons, microspheres, silica, and fuller's earth. Also contemplated would be organic fillers such as wood flour, cork dust, cotton flock, wood felt, nutshells and the like.

A further preferred filler normally present is flake or metal particles such as aluminum flake, steel flake, as well as oxides and sulfides of metals. The amount of metal filler will normally be present in an amount of about 5-60 percent by weight of the final composition. The fillers chosen and their amounts will be adjusted to achieve the desired hardness and sandability of the patching compound. For example, the filler might consist of talc, a relatively soft inorganic filler, calcium carbonate, also a moderately soft inorganic filler, and aluminum powder. The physical properties of materials can be adjusted by increasing the amount of metal particulate where it is desired to achieve a metal like consistency or by increasing the amounts of inorganic or organic particulate fillers where it is desired to achieve a softer, more sandable material. The softer materials could be used for patching of imperfect or damaged molded plastic panels, such as those normally used on automobiles while heavily loaded or harder metal filled powders could be used in patching damaged or imperfect metal panels.

To the resin composition is added a free radical polymerization catalyst. Such a catalyst is generally present in the amount of about 0.5–5 parts of catalyst per 100 parts of composition. Such a free radical catalyst is added to the uncured composition, and upon heating to the catalyst activation temperature, the addition-type cross linking polymerization reaction will commence between the aliphatically unsaturated monomer and the unsaturated polyester resin. Such catalysts are well known in the art. A wide range of free radical generating polymerization catalysts are usable, one group of catalysts being the peroxides. Peroxides usable as free radical polymerization catalysts include benzoyl peroxide, lauroyl peroxide, parachlorobenzoyl peroxide, 2,4-dichlorobenzoyl peroxide, ketone peroxides such as methyl ethyl ketone peroxide, cyclohexanone peroxide, methyl isobutyl ketone peroxide, and other peroxides such as dicumyl peroxide, 2,2'-bis(4,4'-ditertiary butyl peroxy cyclohexyl propane), ditertiary butyl peroxide, cumene hydroperoxide, tertiary butyl cumyl peroxide, tertiary butyl peroctoate and tertiary butyl perbenzoate.

In addition, catalyst promoters can be added in amounts of about 1–5 percent by weight of the resin composition. Examples of suitable catalyst promoters are dimethylaniline or diethylaniline added as a 10 percent by weight of active ingredient dissolved in styrene monomer. Such materials can be mixed with the resin composition and will aid the free radical polymerization catalyst in gelling the resin portion of the composition at room temperature.

One example of how a composition can be made according to this invention is:

| Ingredient | Particle Size | % by Weight |
| --- | --- | --- |
| Talc | about 1–10$\mu$ microns | 18 |
| Calcium Carbonate | about 1–10 microns | 12 |
| Aluminum Flake | about 10–20 microns | 8 |
| Glass Fibers | about 0.5–6.5 mm | 15 |
| Unsaturated Polyester Resins | | 25 |
| Methylmethacrylate Syrup | | 17 |
| 10% Dimethylaniline in Styrene | | 3 |
| Benzoyl Peroxide Paste | | 2 |
| | | 100 |

The above composition provides a mixture which when applied according to the method set forth hereinafter can be room temperature cured and upon subsequent heating with a heat gun or baking oven fully polymerizes to a fully cured patch. The fully cured patch is essentially free of shrinkage during further heating and processing such as would be encountered in a high temperature paint bake oven.

The following procedure outlines one method of using the above composition. For the purposes of illustration it is assumed that a blistered plastic part is being repaired. First, a line is routed around the blister, making an approximately 60° angle from the bottom of the blister to the part's surface and the top of the blister or other imperfection is pried off the molded substrate. Any dry fibrous reinforcing material remaining, such as the fiberglass frequently present in molded plastic articles, is ground off the substrate. The resulting area is then sanded by hand to remove any flaring or imperfections left by cleaning out the blistered area.

The prepared area is then cleaned prior to applying the resin composition such as by the use of dry air to provide a dry, dust free surface.

After preparation and cleaning, the composition detailed above comprising fillers and thermosetting resins is mixed with the free radical catalyst, and the resulting mixture applied to the prepared area. A slight excess of the resin composition is used to allow for any shrinkage of the material during curing.

The resulting patch is cured by heating to about 300° to 350° F., one method being directing hot air from a hot air heat gun, such as those normally available in laboratory and parts supply houses onto the patch. The gun is held at a distance of about 6–8 inches for approximately two to three minutes. During the heating, the patching material will completely cure and will become tightly bonded to the underlying prepared substrate.

After curing, the patch area and the surrounding surface of the part can be sanded using normal sanding and surface finishing techniques. If for some reason a large void should be present in the repaired area, the resulting void can be filled by repeating the above steps. Should there be only minor sanding porosity present, as is the normal case with the composition of this invention, then a standard pitfiller containing small amounts of iron oxide can be smoothed into the resulting porosity to provide an essentially flat porosity-free surface.

The resulting repaired part can be placed on normal painting lines for finishing. Generally during processing on these lines, the part will be primed and be given one or more finish coats of colored paint. The paint coats will be baked at temperatures generally exceeding 300° F. A patch made according to this invention is capable of being processed on these standard processing lines at temperatures in excess of 300° F. for several minutes without the patch separating from the underlying substrate due to shrinkage. Such a feature allows repair of parts which would normally be scrapped prior to painting, resulting in substantial cost savings to the user and also considerable less waste of valuable and increasingly expensive resins made from hydrocarbon materials.

Various modifications and alterations will become apparent to those skilled in the art without departing from the scope and spirit of this invention and it is understood that this invention is not limited to the illustrative embodiment set forth hereinbefore. As one example, the compound of this invention has good adhesion and could be used as an adhesive or body solder for metal parts.

The embodiments of the invention in which an exclusive property or privilege is claimed are defined as follows:

1. A patching composition for repairing a precise surface of plastic or metal parts containing a surface imperfection whereby such parts may be subjected to an additional processing, said composition comprising:
   (a) a patching composition including about 20 to 40 weight percent of a thermosetting resin, said thermosetting resin having the hydroxyl-carboxyl ratio of about 5.7 to 0.8, an acid number of at least 14, a hydroxyl number of 14 to 120, and a molecular weight of about 900 to 3500;
   (b) about 10 to 30 weight percent of a low shrink additive thermoplastic polymer;
   (c) about 5 to 25 percent by weight of a fiberous reinforcing material;
   (d) about 10 to 400 percent by weight of inert organic particles;
   (e) about 5 to 15 percent by weight of metallic particles;
   (f) about 0.5 to 5 percent by weight of a free radical polymerization catalyst; and
   (g) about 0.25 to 5 percent by weight of a catalyst promoter.

2. A patching composition of claim 1 wherein said resin has a glycol-maleate thermosetting resin.

3. The patching composition of claim 1 wherein said resin is a glycol-maleate phthalate thermosetting resin having a ratio of maleate to phthalate of about 3:1.

4. The patching composition of claim 1 wherein said thermosetting resin is a glycol-maleate phthalate resin having a maleate to phthalate ratio of about 2:1.

5. The patching composition of claim 1 wherein said thermoplastic is a styrene solution of methylmethacrylate.

6. The patching composition of claim 1 wherein said thermoplastic is a styrene solution of polyvinylacetate.

* * * * *